United States Patent [19]

Krauss

[11] 4,137,618

[45] Feb. 6, 1979

[54] FRICTION BEARING AND METHOD OF MAKING SUCH A BEARING

[75] Inventor: Dieter Krauss, Munich, Fed. Rep. of Germany

[73] Assignee: Erma-Werke Waffen- und Maschinenfabrik GmbH, Dachau, Fed. Rep. of Germany

[21] Appl. No.: 792,781

[22] Filed: May 2, 1977

Related U.S. Application Data

[63] Continuation-in-part of Ser. No. 641,909, Dec. 18, 1975, abandoned.

[30] Foreign Application Priority Data

Dec. 20, 1974 [DE] Fed. Rep. of Germany ....... 2460684

[51] Int. Cl.² ............................................. B21D 53/10
[52] U.S. Cl. ................................ 29/149.5 S; 264/264; 264/267; 264/134; 264/135; 264/136; 264/137; 264/258; 308/238; 308/239; 308/DIG. 8; 156/293; 156/288; 156/245; 29/149.5 B; 29/149.5 DP; 29/149.5 NM
[58] Field of Search .................... 29/149.5 S, 149.5 B, 29/149.5 DP, 149.5 NM, 149.5 C, 149.5 R; 264/134, 135, 136, 137, 257, 258, 259; 308/173, 238, 239, DIG. 8; 156/245, 288, 293

[56] References Cited

U.S. PATENT DOCUMENTS

| | | | |
|---|---|---|---|
| 2,838,436 | 6/1958 | Clingman | 29/149.5 B |
| 3,202,749 | 8/1965 | White | 29/149.5 B |
| 3,231,963 | 2/1966 | Berar et al. | 29/149.5 B |
| 3,238,602 | 3/1966 | White | 29/149.5 B |
| 3,507,022 | 4/1970 | Conru | 29/149.5 NM |
| 3,522,975 | 8/1970 | White | 308/238 |
| 3,582,166 | 6/1971 | Reising | 308/238 |
| 3,594,049 | 7/1971 | Turner | 29/149.5 B |
| 3,873,168 | 3/1975 | Viola et al. | 308/238 |
| 3,900,408 | 8/1975 | Turner | 308/238 |

Primary Examiner—C. W. Lanham
Assistant Examiner—V. K. Rising
Attorney, Agent, or Firm—W. G. Fasse; W. W. Roberts; W. W. Roberts

[57] ABSTRACT

Spherical friction or sliding bearings are produced by first making a laminate from a layer of a thermosetting resin and a layer of material having a low friction coefficient. The thermosetting resin is used to impregnate a first web or fabric. The low friction coefficient material may be provided in the form of a further webbing or fabric, for instance, made of polytetrafluoroethylene. The thermosetting material may, for example, be a phenolic resin which is at this point of manufacture in its A-state and hence tacky. In order to permit the immediate further processing of the laminate with the thermosetting resin still in its tacky A-state, a dry adhesive film which neutralizes the tackiness, is applied to the laminate in sandwich formation which is then cut into pieces or strips of suitable size. The sandwich strips are then placed into a mold and pre-shaped and precision cut at room temperatures while the resin is still in its A-state. The pre-shaped low friction coefficient laminate is then assembled with the outer and inner bearing members and heated under pressure to such an extent that the thermosetting resin changes substantially from its A-state to its C-state while rapidly passing through the B-state.

18 Claims, 3 Drawing Figures

U.S. Patent     Feb. 6, 1979     4,137,618
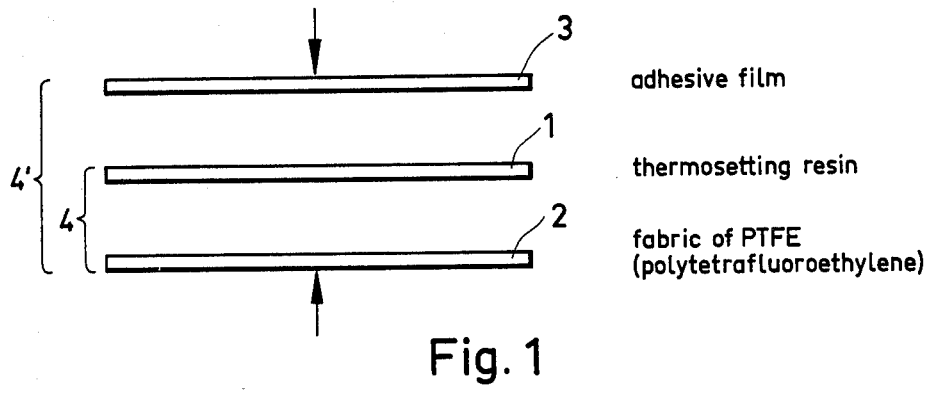
Fig. 1
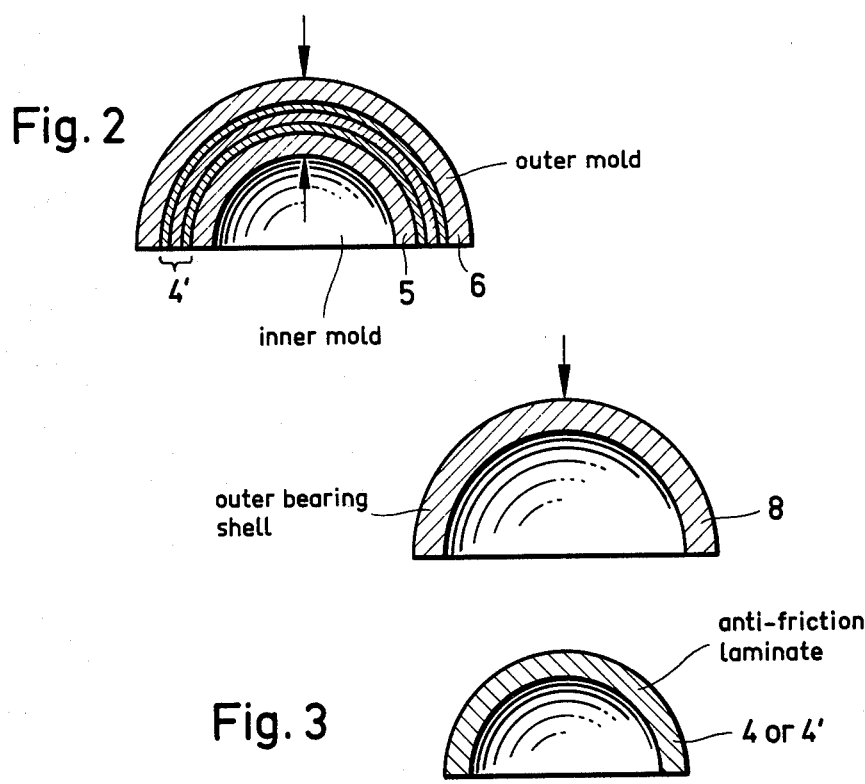
Fig. 2
Fig. 3

FRICTION BEARING AND METHOD OF MAKING SUCH A BEARING

BACKGROUND OF THE INVENTION

This invention is a continuation-in-part of copending application Ser. No. 641,909; filed: Dec. 18, 1975, now abandoned.

The present invention relates to a method of making friction bearings and to bearings made according to the present method. The production of a friction or so called slide bearing having a spherical bearing surface, for example, in a ball and socket joint and in an axial ball and socket joint having an inner ring or shell as well as an outer ring or shell having an antifriction layer covering the bearing surface of the outer ring or shell, requires certain manufacturing steps. Thus, it is necessary to slit the outer ring or shell at one location or to separate the outer ring or shell by cutting at two opposite locations in order to assemble the inner and outer bearing members or shells in such a manner that the inner bearing shell, which comprises its spherical bearing surface on its outside, may be fitted into the outer bearing shell or ring having its spherical bearing surface on its inside.

Prior art glide bearings of this type comprise an antifriction layer made of a metal webbing or fabric impregnated with a synthetic material. In order to apply the material which forms the antifriction layer to the spherical surface of the outer bearing member or shell, it is necessary to pre-shape the antifriction layer material into a spherical shape. This requirement does not pose any problem where a metal webbing or fabric is employed for the antifriction layer. However, the load capacity of an antifriction layer including a metal fabric is limited. Another disadvantage of metal fabric antifriction layers is seen in that the respective bearing may have a play which increases with prolonged use as the metal fabric or webbing yields.

German Patent Publication (DOS) 1,629,417 discloses a slide or antifriction layer made from a webbing or fabric of fibers of polytetrafluoroethylene bonded to a further fabric or webbing impregnated with a phenolic resin and also including an adhesive means. This known laminate material, however, is applied to a slide bearing having a cylindrical bearing surface so that a preforming of the laminate material of the sliding or antifriction layer is not necessary.

U.S. Pat. No. 3,582,166 discloses a bearing with a low friction surface formed of fibers, wherein a low friction resin is embedded in a hard resin matrix, which in turn is bonded to a metal substrate to form a laminate. Before the laminate can be subjected to a further processing, it is necessary to subject the laminate to a heat treatment in order to transform the tacky resin from its A-stage to its B-stage. This may be accomplished by heating to about 100° C. for a time ranging from about ½ hour to 1 hour, in order to avoid the tackiness of the A-stage resin which would interfere with the further processing, since the resin in its A-state would stick to the forming tools.

Similarly, U.S. Pat. No. 3,522,975 discloses a bearing structure in which a strip of cloth is impregnated with the thermosetting resin in its A-stage. Here again, so called "B-staging" is necessary in order to remove the tackiness of the thermosetting resin prior to working the laminate material, because otherwise, the tacky A-state resin would clog the tools. Such B-staging is time consuming and hence increases the costs of the bearing.

OBJECTS OF THE INVENTION

In view of the foregoing, it is the aim of the invention to achieve the following objects, singly or in combination:

to overcome the drawbacks of the prior art, more specifically, to make it possible to use in a spherical slide bearing an antifriction layer including a thermosetting resin which may be pre-shaped while still in its A-state;

to pre-shape, and simultaneously precision cut an antifriction layer, especially for use in a spherical antifriction bearing in such a manner, that in the subsequent final shaping and bonding to a bearing member, the thermosetting resin passes quickly substantially from its A-state through its B-state directly into the C-state;

to provide a glide bearing having a spherical bearing surface which is capable of sustaining high bearing loads and which will not develop any play, even after prolonged use; and to substantially reduce the manufacturing time and hence costs of friction bearings of the type disclosed herein by avoiding the effects of the tacky A-stage thermosetting resin without the need for first "B-staging" the resin.

SUMMARY OF THE INVENTION

According to the invention there is provided a method for the production of slide bearings having a spherical bearing surface, for example, ball and socket bearings including an inner bearing member or shell and a slotted or divided outer bearing shell and wherein an antifriction layer of synthetic material is applied to the bearing surface of the outer bearing shell, said method being characterized in that a material is employed for the sliding layer which includes a thermosetting resin in its A-state embedded, for example, in a first webbing or fabric and a second webbing or fabric of fibers made of a synthetic material having a low friction coefficient, for example, polytetrafluoroethylene. The two fabrics or webbings are bonded to each other to form a laminate and a dry adhesive film is applied to the laminate so that the thermosetting resin in its A-state is sandwiched between the second webbing and the dry adhesive film, for example, a phenol-butyl rubber or caoutchouc such as the adhesive P-18 manufactured by Permacel Inc. whereby the tackiness of the A-state resin is neutralized for immediate further processing without so call "B-staging". The sandwich is then pre-pressed and precision cut into a spherical form while applying heat, whereby the thermosetting resin, such as a phenolic resin is still substantially in its A-state. The pre-pressed and cut shape of the sliding or antifriction layer is then immediately applied to the bearing surface of the outer bearing shell whereupon the inner bearing shell or a mold corresponding in shape to such inner bearing shell is introduced into the outer bearing shell without any delay while simultaneously applying pressure and heat to such an extent that the thermosetting resin changes from substantially its A-stage through its B-state directly into its C-state.

Preferably, the first webbing or fabric which is impregnated with the thermosetting resin is a fiber glass fabric. Sandwiching the tacky thermosetting resin embedded in the first webbing in its A-state between a dry adhesive film and the second webbing having a low friction coefficient has the advantage that B-staging is avoided whereby these bearings may now be completed in minutes, for example, 10 minutes, rather than hours as in the prior art.

BRIEF FIGURE DESCRIPTION

In order that the invention may be clearly understood, it will now be described, by way of example, with reference to the accompanying drawings, wherein:

FIG. 1 is a schematic side view of the antifriction layer material according to the invention in an exploded illustration and including a dry adhesive layer;

FIG. 2 shows a sectional view of a mold employed according to the invention to pre-shape the antifriction layer; and FIG. 3 is an exploded view of the assemblying of the spherical bearing according to the invention.

DETAILED DESCRIPTION OF PREFERRED EXAMPLE EMBODIMENTS

The antifriction layer material is formed as a laminate, the elements or several layers of which are shown in FIG. 1. A first layer 1 of a thermosetting resin, such as a phenolic resin, is employed. The phenolic resin may be used in its A-state to impregnate a fabric or webbing, preferably of fiber glass, to form the layer 1. A second layer 2 is employed which may also comprise a cloth or webbing made of a synthetic material having a low friction coefficient, for example, polytetrafluoroethylene. If desired, the layer 2 may be reinforced by metal and/or glass fibers. The layers 1 and 2 are bonded to each other by pressing them together to form a laminate 4. According to the invention, a third layer 3 in the form of a dry adhesive film made, for example, of a phenobutyl rubber or a phenolic resin already in its B-stage is used to neutralize the tackiness of the A-state phenolic resin by forming a sandwich 4' by pressing the three layers 1, 2, and 3 together.

The sandwich 4' with the thermosetting resin in layer 1 substantially in its A-state but protected or neutralized on the one side by the dry adhesive layer 3 and on the other side by the TEFLON fabric 2 is then cut into strips having a width corresponding to the width of the bearing surface of the outer ring or shell of the spherical bearing elements as shown in FIG. 3. These strips are then, without any "B-staging", shaped and precision cut, preferably in a mold as shown in FIG. 2 including an inner mold shell 5 and an outer mold shell 6. According to the invention, the duration of the application of heat in the step illustrated in FIG. 2 is sufficiently short, for example, 20 seconds, so as not to change the phenolic resin of the layer 1 which is thus after this preshaping still substantially in its A-state. The temperature applied during this short duration pre-shaping step would preferably be in the range of 80° C. to 120° C., if a phenolic resin is employed as the thermosetting material. The pressure applied to the mold portions, as indicated by the arrows in FIG. 2, would be in the range of about 10 kg/cm² to about 50 kg/cm².

After the pre-shaping, as illustrated in FIG. 2, and without any intermediate "B-staging" the bearing members, such as rings or shells, are assembled with the antifriction sandwich 4' which is inserted into the outer bearing shell 8 to contact its bearing surface with the dry adhesive film 3. FIG. 3 does not illustrate that at least the outer bearing shell 8 could be provided as several parts or elements. For example, if the outer shell comprises two elements, these elements are then placed around the inner ring or shell 7. If the outer shell is slotted the inner shell is inserted into the outer shell with the antifriction sandwich 4' therebetween. After the bearing has thus been assembled, pressure is applied as indicated by the arrows in FIG. 3. The pressure would, for example, be in the range of 5 kg/cm² to 25 kg/cm². Simultaneously, further heat is applied so as to change the thermosetting resin substantially from its A-state to its C-state, whereby the B-stage is passed through quickly and the friction bearing is completed rapidly, for example in 10 minutes.

In this connection it should be mentioned that several bearings could be compressed and heated in this manner if they are assembled to form a stack. Further, the inner bearing shells 7 could be replaced by a respectively shaped mold or die for this second compression and heating step wherein the temperature would be from 180° C. to 200° C. In any event, the bonding of the sandwich 4' to the bearing elements is accomplished by the curing of the thermosetting resin.

In view of the above description it will be appreciated that the desired improved bearing characteristics are achieved according to the invention by a substantially continuous operation which does not require any separate B-staging of the thermosetting resin. In this context, it should be noted that the A-state, B-state and C-state of thermosetting resins are defined as follows. The A-state or A-stage is that state, in which the thermosetting resin is sticky. In the B-state or B-stage the resin is no longer sticky, but not yet set. The C-state or C-stage is the thermoset state of the resin.

As the phenolic resin PLYOPHEN A5900, which is a trademark of Reichold Chemical Inc., can be used.

It lies also within the scope of the invention, when the thermosetting resin is not a separate layer, but impregnates the low friction coefficient webbing 2 itself, on the inner surface 2' thereof.

In operation, the practicing of the present method involves impregnating a layer with a thermosetting resin 1 in its A-state or coating one surface 2' of a low friction fabric 2 with such a thermosetting resin 1 in its A-state. Then the tackiness of the A-state resin is neutralized or made ineffective by protecting the thermosetting resin with a dry adhesive film 3, so that the thermosetting resin in its A-stage is sandwiched between the dry adhesive layer 3 and the low friction fabric 2 or the like. The structure may then be immediately preshaped and final shaped because the sandwiched thermosetting resin is prevented from sticking to the tools by the dry adhesive film 3 and by the low friction fabric 2. The bonding to the bearing elements takes place when the thermosetting resin 1 is transformed substantially directly from its A-stage to its C-stage with rapid passing through the B-stage.

Although the invention has been described with reference to specific example embodiments, it is to be understood that it is intended to cover all modifications and equivalents within the scope of the appended claims.

I claim:

1. A method of making friction bearings comprising the following steps in sequence, preparing a laminate antifriction material by applying a thermosetting material in its A-state to one surface of a low friction coefficient webbing to form a coated webbing which initially retains the thermosetting material in its A-state, said webbing preventing said thermosetting material from penetrating through the webbing, then sandwiching under pressure said thermosetting material between said first mentioned webbing and a dry adhesive film, whereby said A-stage thermosetting material is protected by said low friction coefficient webbing on the one side and by said dry adhesive film on the other side, contacting the sandwiched, laminate antifriction material with tool means for pre-shaping said sandwiched, laminate antifriction material while said thermosetting material is still substantially in its A-state, by applying pressure to the antifriction laminate material through said tool means and by simultaneously applying heat to said antifriction laminate material also through said tool means, assemblying the pressure and heat pre-shaped antifriction laminate material with parts of a bearing and applying pressure and heat to the assembled bearing while simultaneously final shaping said antifriction laminate material, whereby said thermosetting material changes substantially from its A-state to its C-state by rapidly passing through its B-state and wherein the tackiness of said A-state is neutralized by said sandwich formation.

2. The method of claim 1, comprising using as said antifriction material a webbing of polytetrafluoroethylene, and using as said thermosetting material a phenolic resin.

3. The method of claim 1, wherein said preshaping is performed at temperatures from 80° C. to 120° C., and at pressures ranging from 10 kg/cm$^2$ to 50 kg/cm$^2$; and wherein said assembled bearing is subjected to temperatures ranging from 180° C. to 200° C. and pressures ranging from 5 kg/cm$^2$ to 25 kg/cm$^2$.

4. The method of claim 1, wherein said dry adhesive film comprises a phenolic resin.

5. The method of claim 4, wherein said phenolic resin of said dry adhesive film is in its B-state.

6. The method of claim 1, wherein said parts of a bearing comprise an outer bearing ring or shell and pressing said pre-shaped laminate antifriction material against the outer bearing ring or shell by means of an inner mold corresponding to the inner bearing ring or shell.

7. The method of claim 1, further comprising reinforcing said low friction coefficient webbing with metal or glass fibers.

8. The method of claim 1, wherein said dry adhesive film comprises a phenol-butyl rubber adhesive film.

9. A spherical friction bearing when produced according to the method of claim 1.

10. A method of making friction bearings comprising the following steps in sequence, preparing a laminate antifriction material by impregnating a webbing (1) with a thermosetting material in its A-state, to form an impregnated webbing which initially retains said thermosetting material in its A-state, then sandwiching under pressure said impregnated webbing with the thermosetting A-state material therein, between a further webbing having a low friction coefficient and a dry adhesive film, whereby said A-stage thermosetting material is protected by said low friction coefficient webbing on the one side and by said dry adhesive film on the other side, contacting the sandwiched, laminate antifriction material with tool means for pre-shaping said sandwiched, laminate antifriction material while said thermosetting material is still substantially in its A-state, by applying pressure to the antifriction laminate material through said tool means and by simultaneously applying heat to said antifriction laminate material also through said tool means, assemblying the pressure and heat pre-shaped antifriction laminate material with parts of a bearing and applying pressure and heat to the assembled bearing while simultaneously final shaping said antifriction laminate material, whereby said thermosetting material changes substantially from its A-state to its C-state by rapidly passing through its B-state and wherein the tackiness of said A-state is neutralized by said sandwich formation.

11. The method of claim 10, comprising using as said first mentioned, impregnated webbing a glass fiber webbing, using as said further webbing having a low friction coefficient a webbing of polytetrafluoroethylene, and using as said thermosetting material a phenolic resin.

12. The method of claim 10, wherein said preshaping is performed at temperatures from 80° C. to 120° C., and at pressures ranging from 10 kg/cm$^2$ to 50 kg/cm$^2$; and wherein said assembled bearing is subjected to temperatures ranging from 180° C. to 200° C. and pressures ranging from 5 kg/cm$^2$ to 25 kg/cm$^2$.

13. The method of claim 10, wherein said dry adhesive film comprises a phenolic resin.

14. The method of claim 13, wherein said phenolic resin of said dry adhesive film is in its B-state.

15. The method of claim 10, wherein said parts of a bearing comprise an outer bearing ring or shell and pressing said pre-shaped laminate antifriction material against the outer bearing ring or shell by means of an inner mold corresponding to the inner bearing ring or shell.

16. The method of claim 10, further comprising reinforcing said low friction coefficient webbing with metal or glass fibers.

17. The method of claim 10, wherein said dry adhesive film comprises a phenol-butyl rubber adhesive film.

18. A spherical friction bearing when produced according to the method of claim 10.

* * * * *